(12) United States Patent
Jeong

(10) Patent No.: US 8,344,940 B2
(45) Date of Patent: Jan. 1, 2013

(54) APPARATUS AND SENSOR FOR ADJUSTING SENSOR VERTICAL ALIGNMENT

(75) Inventor: Seong-hee Jeong, Seoul (KR)

(73) Assignee: Mando Corporation, Gyeonggi-Do (KR)

( * ) Notice: Subject to any disclaimer, the term of this patent is extended or adjusted under 35 U.S.C. 154(b) by 268 days.

(21) Appl. No.: 12/692,049

(22) Filed: Jan. 22, 2010

(65) Prior Publication Data

US 2010/0182199 A1   Jul. 22, 2010

(30) Foreign Application Priority Data

Jan. 22, 2009  (KR) .................. 10-2009-0005593
Dec. 31, 2009  (KR) .................. 10-2009-0135472

(51) Int. Cl.
  *G01S 13/00* (2006.01)
  *G01S 7/40* (2006.01)
(52) U.S. Cl. ............... 342/75; 342/70; 342/73; 342/74; 342/173; 342/174
(58) Field of Classification Search ............. 342/70–77, 342/81, 82, 89, 169–174
See application file for complete search history.

(56) References Cited

U.S. PATENT DOCUMENTS

| | | | | |
|---|---|---|---|---|
| 4,562,439 A | * | 12/1985 | Peralta et al. | 342/81 |
| 5,008,678 A | * | 4/1991 | Herman | 342/158 |
| 5,130,715 A | * | 7/1992 | Yanagisawa | 342/158 |
| 5,598,163 A | * | 1/1997 | Cornic et al. | 342/70 |
| 6,026,353 A | * | 2/2000 | Winner | 702/183 |
| 6,119,067 A | * | 9/2000 | Kikuchi | 701/300 |
| 6,122,040 A | * | 9/2000 | Arita et al. | 356/4.01 |
| 6,246,359 B1 | * | 6/2001 | Asano et al. | 342/158 |
| 6,288,672 B1 | * | 9/2001 | Asano et al. | 342/374 |
| 6,335,705 B1 | * | 1/2002 | Grace et al. | 343/703 |
| 6,337,656 B1 | * | 1/2002 | Natsume et al. | 342/149 |
| 6,363,619 B1 | * | 4/2002 | Schirmer et al. | 33/288 |
| 6,437,731 B1 | * | 8/2002 | Henrio et al. | 342/165 |
| 6,476,760 B1 | * | 11/2002 | Winter et al. | 342/173 |
| 6,556,166 B1 | * | 4/2003 | Searcy et al. | 342/165 |
| 6,573,859 B2 | * | 6/2003 | Tokoro | 342/70 |
| 6,636,172 B1 | * | 10/2003 | Prestl et al. | 342/173 |
| 6,714,156 B1 | * | 3/2004 | Ibrahim et al. | 342/174 |
| 6,750,810 B2 | * | 6/2004 | Shinoda et al. | 342/149 |
| 6,763,318 B1 | * | 7/2004 | Winter et al. | 702/158 |
| 6,778,131 B2 | * | 8/2004 | Haney et al. | 342/174 |
| 6,853,329 B2 | * | 2/2005 | Shinoda et al. | 342/149 |
| 6,896,082 B2 | * | 5/2005 | Asanuma et al. | 180/169 |
| 6,907,269 B2 | * | 6/2005 | Yamaguchi et al. | 455/561 |
| 6,956,227 B2 | * | 10/2005 | Miyazaki et al. | 250/559.38 |
| 7,079,073 B2 | * | 7/2006 | Fujita | 342/174 |
| 7,106,421 B2 | * | 9/2006 | Matsuura et al. | 356/4.01 |

(Continued)

*Primary Examiner* — Jack W Keith
*Assistant Examiner* — Peter Bythrow
(74) *Attorney, Agent, or Firm* — McDermott Will & Emery LLP

(57) ABSTRACT

Provided are a sensor capable of adjusting vertical alignment and a sensor vertical alignment adjusting apparatus using the same. The sensor has a structure with a plurality of switchable transmitting and receiving antennas so as to be able to adjust the vertical alignment, or a structure with a tilting motor for adjusting a radiating or receiving angle. The sensor vertical alignment adjusting apparatus using such a sensor corrects vertical misalignment of the sensor by determining whether or not the vertical misalignment of the sensor occurs, variably switching one from among the plurality of transmitting or receiving antennas of the sensor or controlling the tilting motor, and adjusting the radiating angle of the sensor signal or the receiving angle of a reflected wave of the sensor signal.

14 Claims, 12 Drawing Sheets

U.S. PATENT DOCUMENTS

| | | | |
|---|---|---|---|
| 7,132,976 B2* | 11/2006 | Shinoda et al. | 342/70 |
| 7,151,482 B2* | 12/2006 | Natsume et al. | 342/147 |
| 7,167,235 B2* | 1/2007 | Kikuchi | 356/4.01 |
| 7,196,656 B2* | 3/2007 | Shirakawa | 342/147 |
| 7,221,310 B2* | 5/2007 | Nakagawa | 342/174 |
| 7,304,602 B2* | 12/2007 | Shinagawa et al. | 342/174 |
| 7,423,578 B1* | 9/2008 | Tietjen | 342/59 |
| 7,498,970 B2* | 3/2009 | Yoshida | 342/70 |
| 7,522,097 B2* | 4/2009 | Wakeman | 342/174 |
| 7,571,066 B2* | 8/2009 | Hover et al. | 702/104 |
| 7,602,477 B2* | 10/2009 | Nakamura et al. | 356/4.07 |
| 7,663,537 B2* | 2/2010 | Suzuki et al. | 342/133 |
| 7,817,081 B2* | 10/2010 | Inoue et al. | 342/70 |
| 2002/0105456 A1* | 8/2002 | Isaji | 342/165 |
| 2004/0246168 A1* | 12/2004 | Isaji | 342/70 |
| 2006/0176214 A1* | 8/2006 | Nakagawa | 342/174 |
| 2008/0030394 A1* | 2/2008 | Yoshida | 342/74 |
| 2009/0140912 A1* | 6/2009 | Kato et al. | 342/70 |

\* cited by examiner (a)

(b)

(a)

(b)

100

(a)

(b)

APPARATUS AND SENSOR FOR ADJUSTING SENSOR VERTICAL ALIGNMENT

BACKGROUND OF THE INVENTION

1. Field of the Invention

The present invention relates generally to an apparatus and sensor for adjusting sensor vertical alignment, and more particularly to a technique in which, when vertical alignment of a sensor mounted in a vehicle becomes incorrect, this misalignment is detected to adjust the vertical alignment of the sensor.

2. Description of the Prior Art

With the recent development of vehicle intelligence technologies, the intelligence technologies such as an adaptive cruise control (ACC) system and a stop and go system for following a leading vehicle, a blind spot detection (BSD) system for detecting a vehicle blind zone, a lane change assist (LCA) system for safely changing a lane, a pre-crash system and a collision avoidance system for preventing collision with a leading vehicle, etc. are applied to the vehicles. These intelligence technologies essentially require sensors such as a radar sensor, an ultrasonic sensor, etc. to carry out their own functions, and are allowed to perform correct functions only when correct information is detected by these sensors.

However, the sensors mounted in the vehicle may be subjected to a change in position or direction due to collision accidents, decrepitude of the vehicle. When this situation occurs, the accuracy of information detected by the sensors is reduced, and thus various systems using these sensors may cause a problem with their functions. Accordingly, when the positions or directions of the sensors mounted in the vehicle are changed due to collision accidents, decrepitude of the vehicle, the alignment of each sensor must be adjusted with respect to its horizontal and vertical planes. In the case of the radar sensor mounted in the vehicle, its horizontal alignment is automatically adjusted by software, but its vertical alignment is not adjusted automatically. As such, whenever it is necessary to adjust the vertical alignment of the radar sensor, its service must be given.

SUMMARY OF THE INVENTION

Accordingly, the present invention has been made to solve the above-mentioned problems occurring in the prior art, and an object of the present invention is to provide an apparatus and sensor for adjusting sensor vertical alignment, in which, when a sensor mounted in a vehicle is subjected to a change in position or direction due to a little fender-bender, a rear-end or head-on collision, decrepitude of the vehicle, this change is detected to automatically adjust vertical alignment of the sensor.

Another object of the present invention is to provide an apparatus and sensor for adjusting sensor vertical alignment, capable of sensing whether or not it is necessary to adjust vertical alignment of the sensor, automatically adjusting the vertical alignment of the sensor if it is necessary to do so, causing any systems using the sensor to carry out their correct functions through such adjustment, and ultimately ensuring safe driving to a driver of the vehicle.

In accordance with an aspect of the present invention, there is provided an apparatus for adjusting sensor vertical alignment, which includes: a surface reflected wave measuring unit measuring the signal intensity of a surface reflected wave reflected from a road surface on the basis of the reflected wave received by a sensor signal transmitted from a sensor; a vertical misalignment determining unit determining that vertical misalignment of the sensor occurs when the measured signal intensity of the surface reflected wave exceeds a reference signal intensity; and a vertical alignment adjusting unit correcting the vertical misalignment of the sensor by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment.

In accordance with another aspect of the present invention, there is provided an apparatus for adjusting sensor vertical alignment, which includes: a reflected wave measuring unit measuring the signal intensity of a reflected wave received by a sensor signal transmitted from a sensor; a vertical misalignment determining unit determining that vertical misalignment of the sensor occurs when the measured signal intensity of the reflected wave is lower than a reference signal intensity; and a vertical alignment adjusting unit correcting the vertical misalignment of the sensor by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment.

In accordance with yet another aspect of the present invention, there is provided an apparatus for adjusting sensor vertical alignment, which includes: a vertical slope measuring unit measuring a vertical slope of a sensor on the basis of a road surface using an acceleration sensor; a vertical misalignment determining unit determining that vertical misalignment of the sensor occurs when a difference between the measured vertical slop of the sensor and a vertical slope of the road surface exceeds a predetermined range; and a vertical alignment adjusting unit correcting the vertical misalignment of the sensor by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment such that the difference between the measured vertical slop of the sensor and the vertical slope of the road surface is within the predetermined range.

In accordance with still yet another aspect of the present invention, there is provided a sensor, which includes: a plurality of transmitting antennas set to different radiating angles; a switch selecting the transmitting antenna set to the radiating angle nearest a desired radiating angle from the transmitting antennas such that a sensor signal is transmitted at the desired radiating angle; and a plurality of receiving antennas receiving a reflected wave of the sensor signal transmitted through the transmitting antenna selected by the switch.

In accordance with still yet another aspect of the present invention, there is provided a sensor, which includes: a plurality of transmitting antennas transmitting a sensor signal; a plurality of receiving antennas set to different receiving angles; and a switch selecting the receiving antenna set to the receiving angle nearest a specific radiating angle from the receiving antennas such that one of the plurality of transmitting antennas receives a reflected wave of the sensor signal transmitted at the specific radiating angle.

According to embodiments of the present invention as described above, when a sensor mounted in a vehicle is subjected to a change in position or direction due to a little fender-bender, a rear-end or head-on collision, decrepitude of the vehicle, this change can be detected to automatically adjust vertical alignment of the sensor.

Further, it is sensed whether or not it is necessary to adjust vertical alignment of the sensor. If it is necessary to do so, the vertical alignment of the sensor can be automatically adjusted. Thereby, any systems using the sensor are allowed to carry out their correct functions, and ultimately ensuring safe driving to a driver of the vehicle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
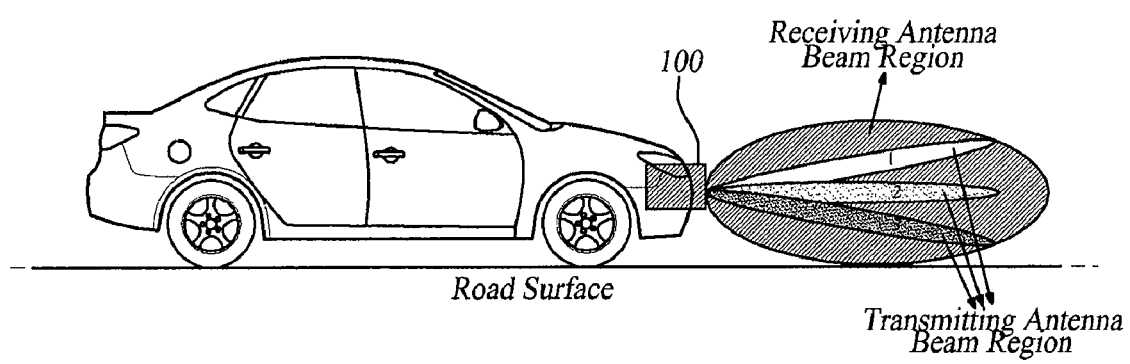
FIG. 1 shows a transmitting antenna beam region and a receiving antenna beam region for a sensor disclosed in the present invention.

Hereinafter, preferred embodiments of the present invention will be described with reference to the accompanying drawings. In the following description and drawings, the same reference numerals are used to designate the same or similar components, and so repetition of the description on the same or similar components will be omitted.

In the description of the elements of the present invention, the terms 'first', 'second', 'A', 'B', '(a)', and '(b)' may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to', "engaged with", or "connected to" the other element between them.

FIG. 1 shows a transmitting antenna beam region and a receiving antenna beam region for a sensor 100 disclosed in the present invention.

The sensor 100 disclosed in the present invention functions to transmit a sensor signal through at least one transmitting antenna and receive a reflected wave, which is reflected from an object or a road surface by the transmitted signal, through a receiving antenna. To correctly perform this function, vertical alignment of the sensor 100 must be correctly set.

Referring to FIG. 1, the sensor 100 disclosed in the present invention can transmit a sensor signal to various regions including a first transmitting antenna beam region, a second transmitting antenna beam region, a third transmitting antenna beam region, etc. through a transmitting antenna after its vertical alignment is adjusted, and receive a reflected wave reflected by the sensor signal into a receiving antenna beam region.

As shown in FIG. 1, the sensor 100 disclosed in the present invention can control the sensor signal to be transmitted to the various regions including the first transmitting antenna beam region, the second transmitting antenna beam region, the third transmitting antenna beam region, etc. Particularly, when the sensor 100 mounted in a vehicle is subjected to a change in position or direction due to a traffic accident such as a rear-end or head-on collision, decrepitude of the vehicle, or the like, the sensor 100 is directed toward, for instance, a road surface or its opposition. As a result, the vertical alignment of the sensor 100 becomes incorrect. In this case, the sensor signal may be transmitted to the third transmitting antenna beam region or the first transmitting antenna beam region of FIG. 1 through the transmitting antenna of the sensor 100. In the state where the vertical misalignment of the sensor 100 occurs, the sensor 100 controls the sensor signal to be transmitted to the second transmitting antenna beam region of FIG. 1, thereby adjusting its vertical alignment by correcting the vertical misalignment.

In FIG. 1, it is shown that the vertical alignment of the sensor 100 is adjusted by adjusting a radiating angle of the sensor signal using one selected from the various transmitting antennas. However, according to embodied circumstances, the vertical alignment of the sensor 100 may be adjusted by adjusting a receiving angle of the reflected wave of the sensor signal using one selected from the various transmitting antennas.

Figure 2:
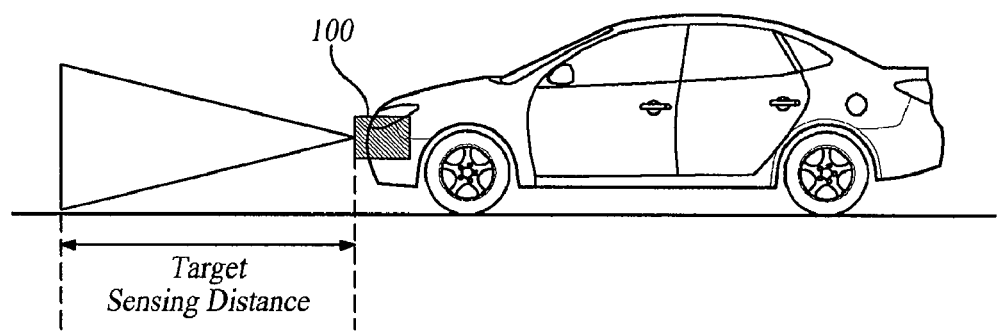
FIG. 2 shows a sensor signal transmitted when vertical alignment of a sensor disclosed in the present invention is adjusted correctly or incorrectly.
Figure 2:
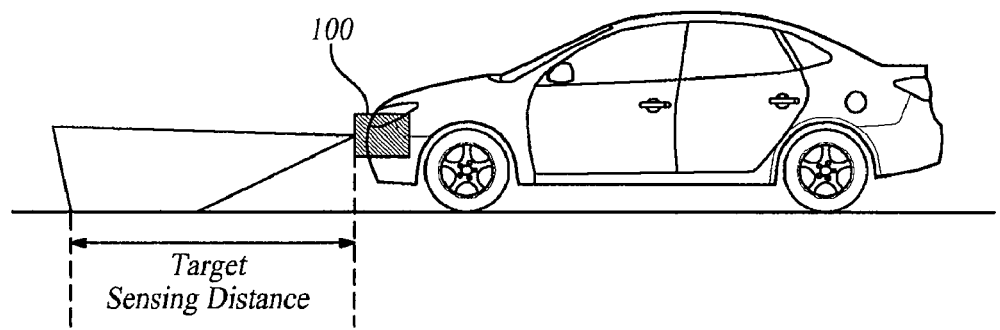

Meanwhile, when the vertical misalignment of the sensor 100 occurs, a sensible maximum distance from a target, i.e. a target sensing distance, may be abruptly decreased or increased. For example, referring to FIG. 2, it can be seen that the target sensing distance in FIG. 2B where the sensor 100 is directed toward the road surface, i.e. where the vertical misalignment of the sensor 100 occurs is further reduced compared to that in FIG. 2A where the vertical alignment of the sensor 100 is correctly adjusted.

The aforementioned function of adjusting the vertical alignment of the sensor 100 may be generally divided into a function of determining whether or not the vertical misalignment occurs and a function of correcting the vertical misalignment.

Figure 10:
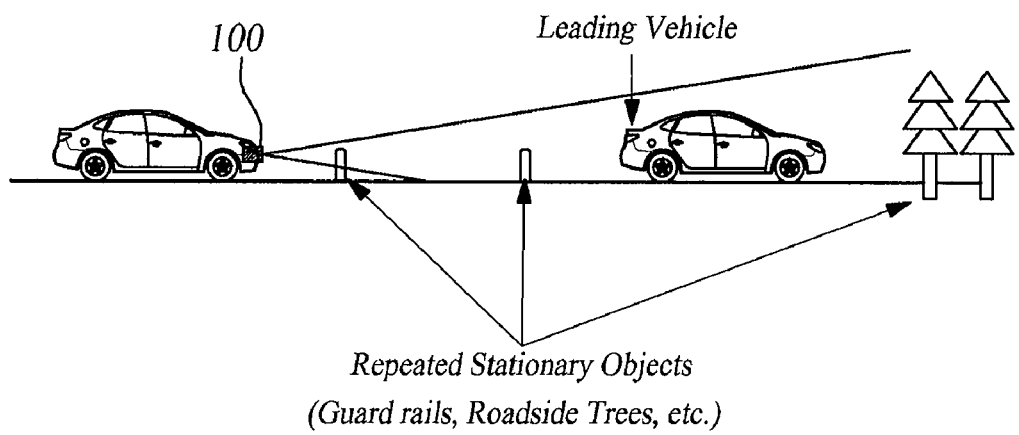
FIG. 10 is a view for explaining a method of measuring a reflected wave in an apparatus for adjusting sensor vertical alignment according to another embodiment of the present invention.
Figure 10:
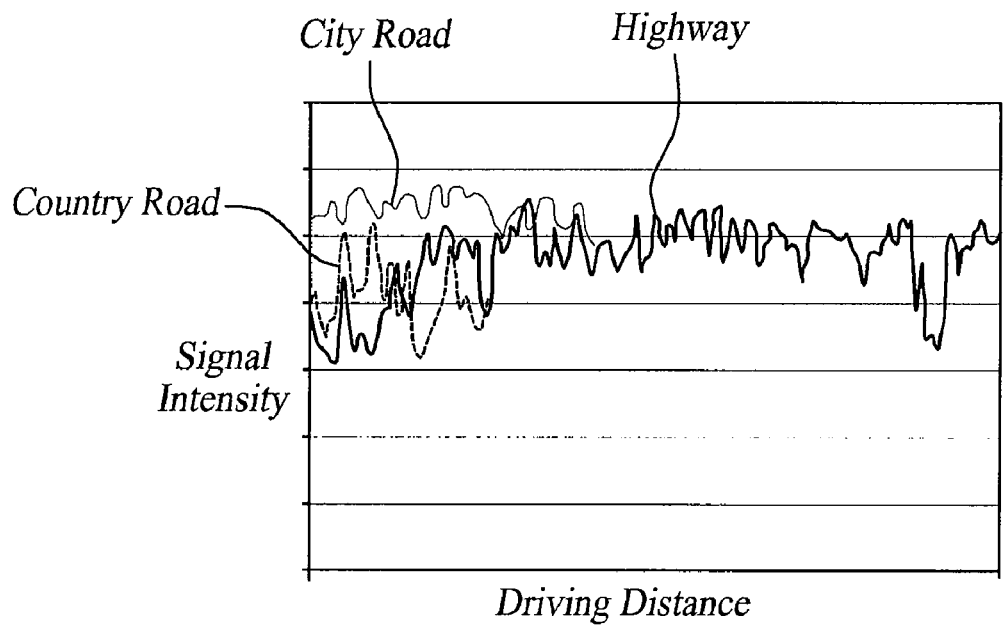
Figure 11:
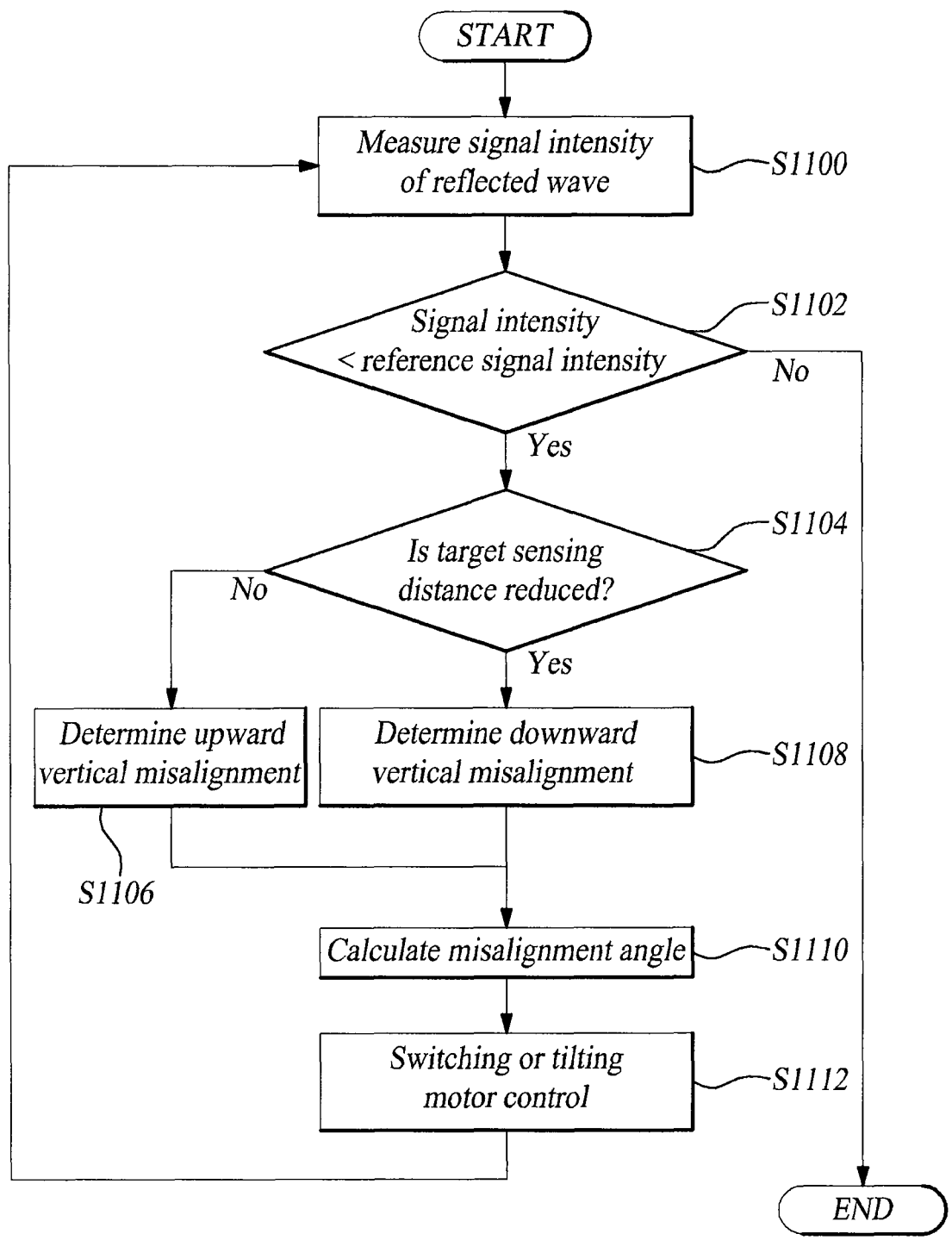
FIG. 11 is a flow chart showing a method of adjusting sensor vertical alignment according to another embodiment of the present invention.
Figure 12:
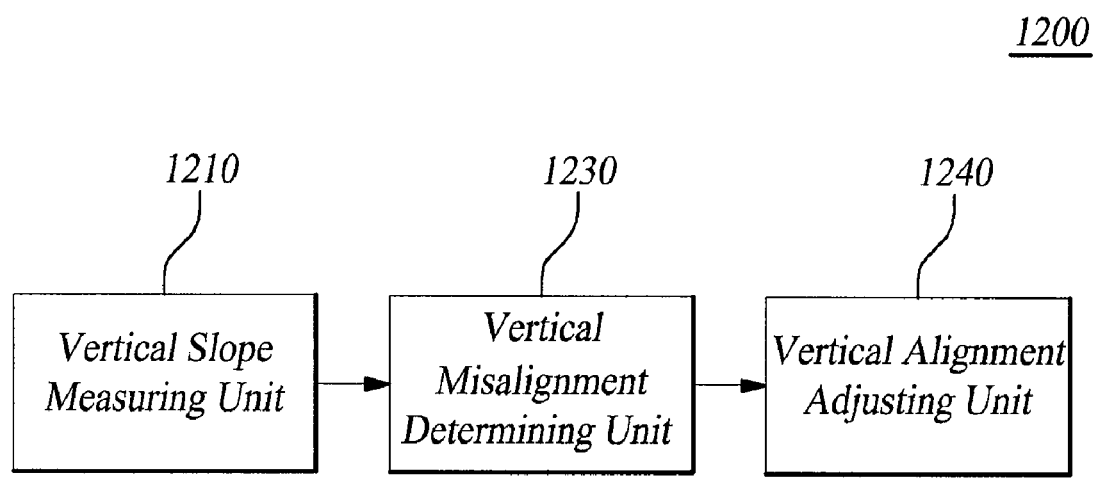
FIG. 12 is a block diagram showing an apparatus for adjusting sensor vertical alignment according to yet another embodiment of the present invention.

A method of determining whether or not the vertical misalignment occurs may use a method based on measurement of signal intensity of the reflected wave reflected from the road surface by the transmitted sensor signal (FIGS. 6 through 8), a method based on measurement of signal intensity of the reflected wave reflected from the object by the transmitted sensor signal (FIGS. 9 through 11), or a method based on measurement of a vertical slope of the sensor (FIG. 12). Here, the reflected wave reflected from the road surface, the reflected wave reflected from the object, and the vertical slope are vertical posture information of the sensor 100. Further, when it is determined whether or not the vertical misalignment occurs, it is possible to simultaneously consider whether or not the target sensing distance varies.

Figure 3:
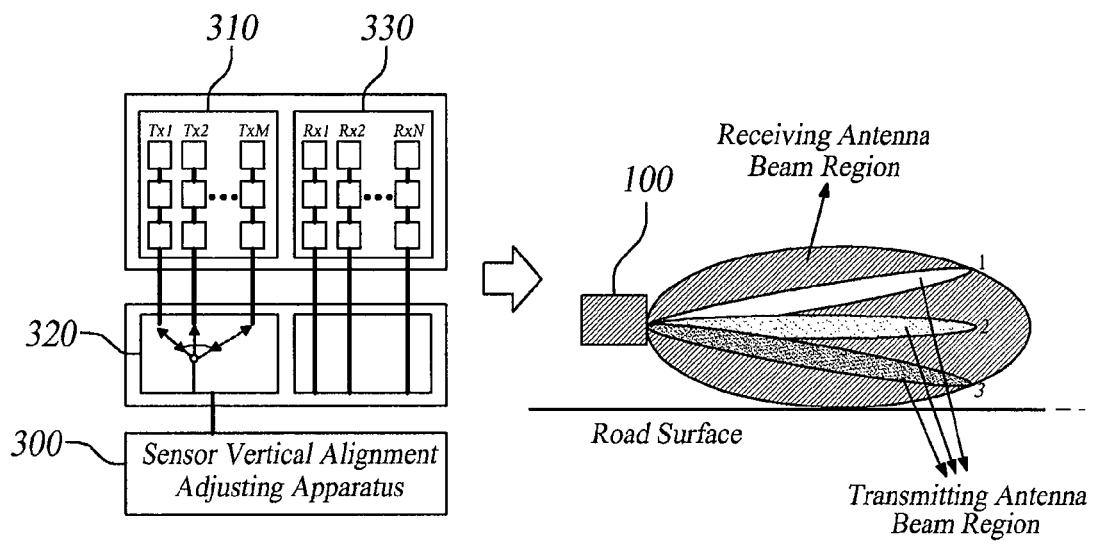
FIG. 3 shows a sensor having a vertical alignment adjusting function based on an antenna switching mode in accordance with an embodiment of the present invention.
Figure 3:
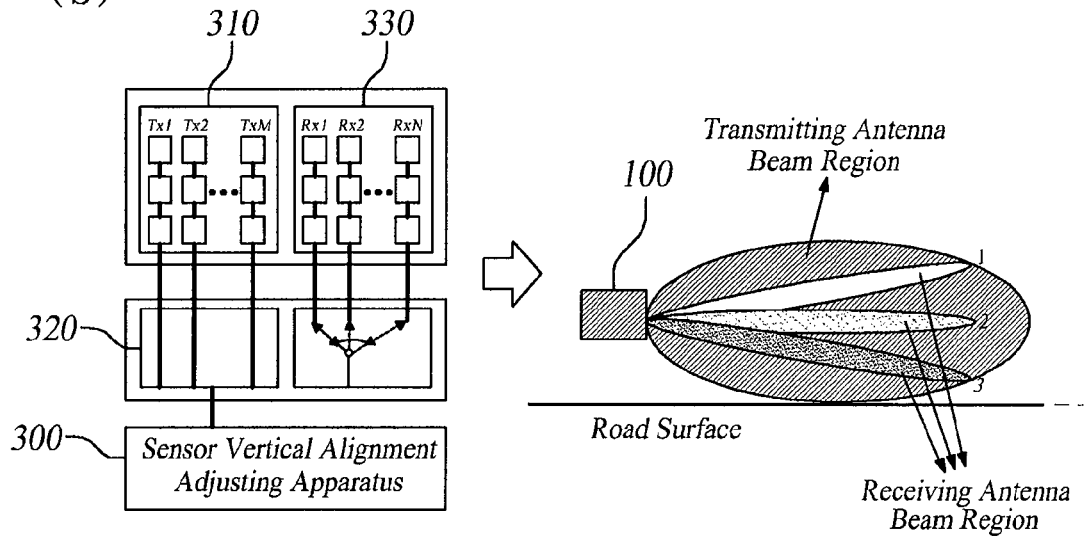
Figure 4:
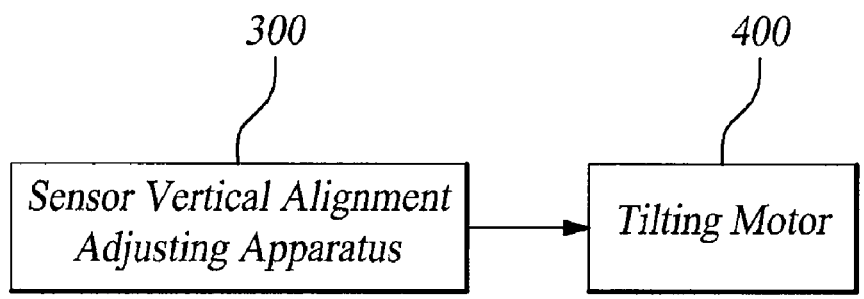
FIG. 4 shows a sensor having a vertical alignment adjusting function based on a tilting motor control mode in accordance with another embodiment of the present invention.

Meanwhile, a method of correcting the vertical misalignment may use a method based on antenna switching (FIG. 3) or a method based on the control of a tilting motor (FIG. 4).

When correcting the vertical misalignment through the antenna switching, particularly the transmitting antenna switching, the sensor 100 includes a plurality of transmitting antennas that are set to different radiating angles of the sensor signal, and a switch capable of switching one of the transmitting antennas to one set to the radiating angle required to correct the vertical misalignment.

Further, When correcting the vertical misalignment through the antenna switching, particularly the receiving antenna switching, the sensor 100 includes a plurality of receiving antennas that are set to different receiving angles of the reflected wave of the sensor signal, and a switch capable of switching one of the receiving antennas to one set to the receiving angle required to correct the vertical misalignment.

When correcting the vertical misalignment through the control of the tilting motor, the sensor 100 is configured such that its own angle can be controlled by the tilting motor, or that the radiating angle (directing angle), at which one of the transmitting antennas transmits the sensor signal, can be controlled by the tilting motor.

FIG. 3 shows a sensor 100 having a vertical alignment adjusting function based on an antenna switching mode in accordance with an embodiment of the present invention.

In FIG. 3, the sensor 100 is divided into two types: the first one having a structure where the transmitting antenna is variably switched and the second one having a structure where the receiving antenna is variably switched, both of which will be described with reference to FIGS. 3A and 3B, respectively.

FIG. 3A shows a sensor 100 having a structure that can variably switch transmitting antennas to adjust a radiating angle of a sensor signal, and beam regions of the transmitting antennas and a beam region of receiving antennas.

Referring to FIG. 3A, the sensor 100 having the vertical alignment adjusting function based on the antenna switching mode in accordance with an embodiment of the present invention includes a plurality of transmitting antennas Tx1, Tx2, . . . , TxM or 310 set to different radiating angles at which the sensor signal is transmitted, a switch 320 selecting one of the transmitting antennas Tx1, Tx2, . . . , TxM or 310 which is set to the radiating angle nearest a desired radiating angle such that the sensor signal is set at the desired radiating angle, and a plurality of receiving antennas Rx1, Rx2, . . . , RxN or 330 receiving a reflected wave of the sensor signal transmitted through the transmitting antenna selected by the switch 320.

Referring to the right-hand part showing beam regions in FIG. 3A, since the plurality of receiving antennas Rx1, Rx2, . . . , RxN or 330 are set to receiving angles corresponding to the radiating angles differently set for the plurality of transmitting antennas Tx1, Tx2, . . . , TxM or 310 respectively, they can cover all the radiating angles at which the plurality of transmitting antennas Tx1, Tx2, . . . , TxM or 310 can selectively radiate the sensor signal.

As shown in FIG. 3A, the beam region of the plurality of receiving antennas is a single beam region that covers all the beam regions of the plurality of transmitting antennas variably selected by the switch 320.

Referring to FIG. 3A, the sensor 100 having the vertical alignment adjusting function based on the antenna switching mode in accordance with an embodiment of the present invention may further include an apparatus 300 for adjusting its vertical alignment, which measures the signal intensity of a reflected wave reflected and received from an object and/or a road surface by a sensor signal, determines whether or not vertical misalignment of the sensor 100 occurs on the basis of the measured signal intensity of the reflected wave and a reference signal intensity, calculates a misalignment angle of the sensor 100 to correct the vertical misalignment of the sensor 100 when it is determined that the vertical misalignment of the sensor 100 occurs, and determines a desired radiating angle of the sensor 100 to correct the misalignment angle.

The desired radiating angle determined by this sensor vertical alignment adjusting apparatus 300 is used for the switch 320 to select one of the plurality of transmitting antennas Tx1, Tx2, . . . , TxM or 310.

FIG. 3B shows a sensor 100 having a structure that can variably switch receiving antennas to adjust a receiving angle of the reflected wave of a sensor signal, and a beam region of transmitting antennas and beam regions of the receiving antennas.)

Referring to FIG. 3B, the sensor 100 having the vertical alignment adjusting function based on the antenna switching mode in accordance with an embodiment of the present invention includes a plurality of transmitting antennas Tx1, Tx2, . . . , TxM or 310 transmitting a sensor signal, a plurality of receiving antennas Rx1, Rx2, . . . , RxN or 330 set to different receiving angles, and a switch 320 selecting one of the receiving antennas Rx1, Rx2, . . . , RxN or 330 which is set to the receiving angle nearest a specific radiating angle at which the sensor signal is transmitted such that a reflected wave of the sensor signal, which is transmitted from one of the transmitting antennas Tx1, Tx2, . . . , TxM or 310 at the specific radiating angle, is received.

Referring to the right-hand part showing beam regions in FIG. 3B, the plurality of transmitting antennas Tx1, Tx2, . . . , TxM or 310 are set to radiating angles corresponding to all the receiving angles differently set for the plurality of receiving antennas Rx1, Rx2, . . . , RxN or 330 respectively. In other words, the beam region of the transmitting antennas covers all the beam regions of the individual receiving antennas. Even when the plurality of transmitting antennas Tx1, Tx2, . . . , TxM or 310 transmit the sensor signal at any radiating angle, it is possible to select the receiving antenna set to the receiving angle corresponding to the radiating angle to receive the reflected wave of the sensor signal.

As shown in FIG. 3B, the beam region of the plurality of transmitting antennas is a single beam region that covers all the beam regions of the plurality of receiving antennas variably selected by the switch 320.

Referring to FIG. 3B, the sensor 100 having the vertical alignment adjusting function based on the antenna switching mode in accordance with an embodiment of the present invention may further include an apparatus 300 for adjusting its vertical alignment, which measures the signal intensity of a reflected wave reflected and received from an object and/or a road surface by a sensor signal, determines whether or not vertical misalignment of the sensor 100 occurs on the basis of the measured signal intensity of the reflected wave and a reference signal intensity, and causes the switch 320 to select one of the plurality of receiving antennas Rx1, Rx2, . . . , RxN or 330 which is set to a receiving angle nearest a specific radiating angle of the sensor signal to correct the vertical misalignment of the sensor 100 when it is determined that the vertical misalignment of the sensor 100 occurs.

FIG. 4 shows a sensor 100 having a vertical alignment adjusting function based on a tilting motor control mode in accordance with another embodiment of the present invention.

Referring to FIG. 4, the sensor 100 having the vertical alignment adjusting function based on the tilting motor control mode in accordance with another embodiment of the present invention includes: an apparatus 300 for adjusting its vertical alignment, which measures the signal intensity of a reflected wave reflected and received from an object and/or a road surface by a sensor signal, determines whether or not vertical misalignment of the sensor 100 occurs on the basis of the measured signal intensity of the reflected wave and a reference signal intensity, calculates a misalignment angle of the sensor 100 to correct the vertical misalignment of the sensor 100 when it is determined that the vertical misalignment of the sensor 100 occurs, and determines a desired radiating angle of the sensor 100 to correct the misalignment angle; and a tilting motor 400 adjusting the sensor 100 itself or radiating angles of transmitting antennas included in the sensor 100 on the basis of the desired radiating angle determined by the sensor vertical alignment adjusting apparatus 300.

Figure 5:
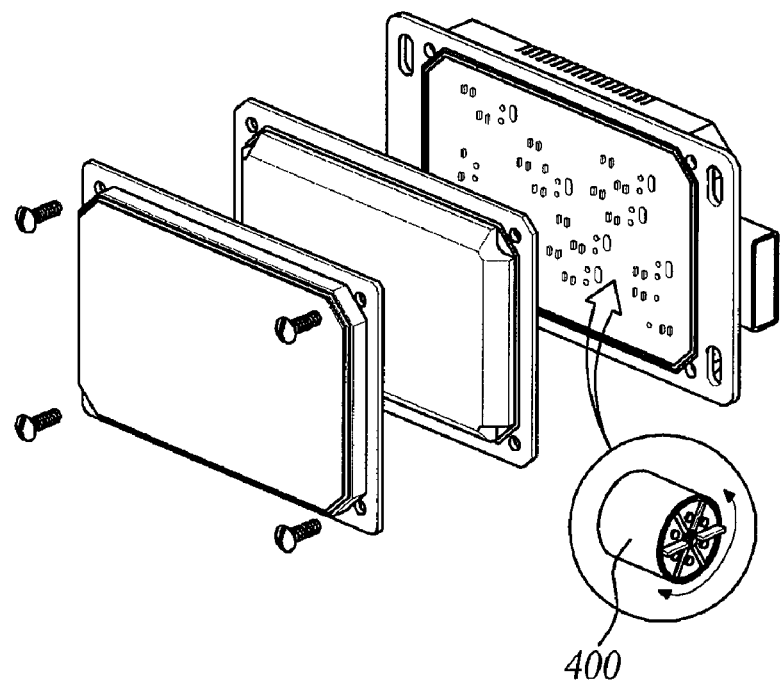
FIG. 5 shows a sensor having a tilting motor in accordance with another embodiment of the present invention.

The sensor 100 having the vertical alignment adjusting function based on the tilting motor control mode in accordance with another embodiment of the present invention can be realized into a structure including the tilting motor 400, as shown in FIG. 5.

Hereinafter, when measuring the signal intensity of the reflected from the road surface by the transmitted sensor signal to determine and correct the vertical misalignment of the sensor 100, the sensor vertical alignment adjusting apparatus will be described in detail with reference to FIGS. 6 through 8. Further, when measuring the signal intensity of the reflected from the object by the transmitted sensor signal to determine and correct the vertical misalignment of the sensor 100, the sensor vertical alignment adjusting apparatus will be described in detail with reference to FIGS. 9 through 11. When measuring the vertical slope of the sensor 100 to determine and correct the vertical misalignment of the sensor 100, the sensor vertical alignment adjusting apparatus will be described in detail with reference to FIG. 12.

Figure 6:
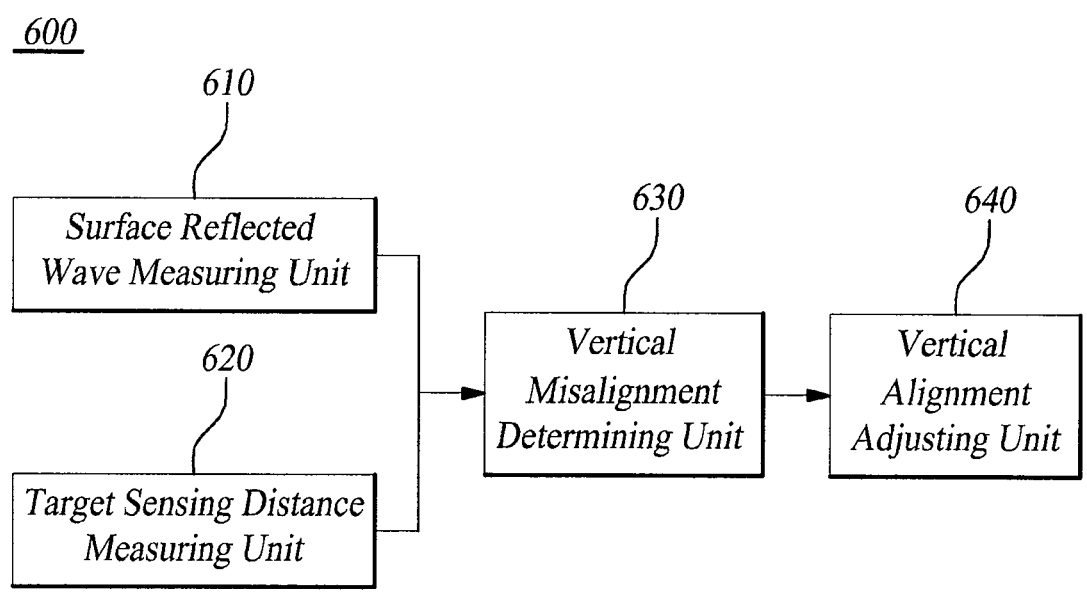
FIG. 6 is a block diagram showing an apparatus for adjusting sensor vertical alignment according to an embodiment of the present invention.
Figure 7:
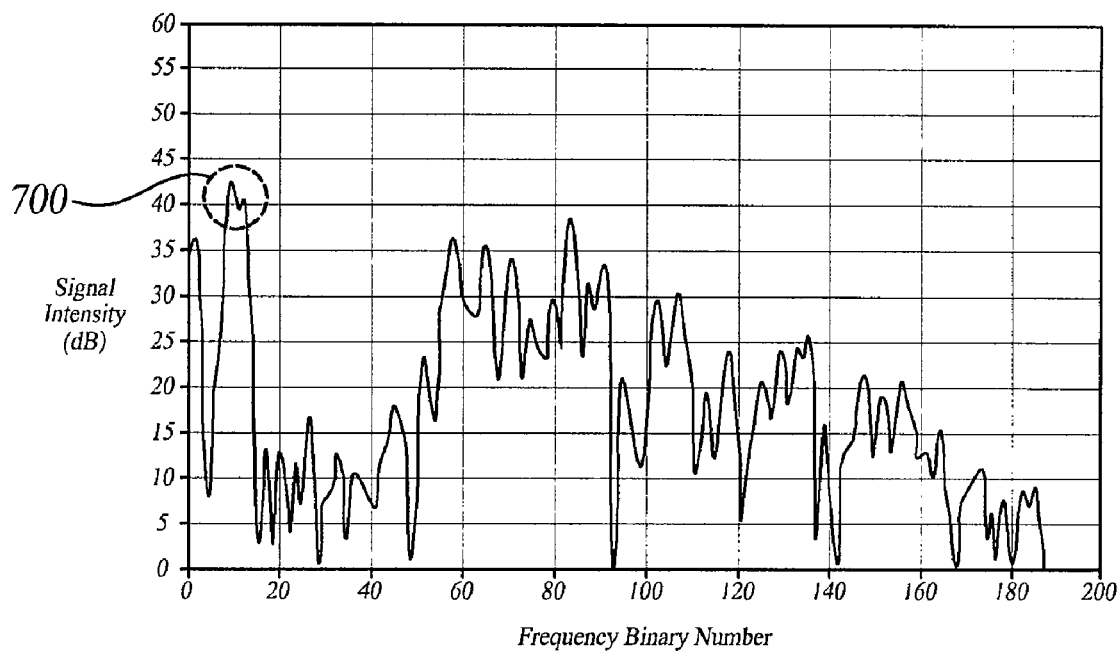
FIG. 7 is a view for explaining a method of measuring a surface reflected wave in an apparatus for adjusting sensor vertical alignment according to an embodiment of the present invention.

FIG. 6 is a block diagram showing an apparatus 600 for adjusting sensor vertical alignment according to an embodiment of the present invention.

Referring to FIG. 6, the sensor vertical alignment adjusting apparatus 600 according to an embodiment of the present invention includes a surface reflected wave measuring unit 610 measuring the signal intensity of a reflected wave reflected from a road surface on the basis of the reflected wave received by a sensor signal transmitted from a sensor 100, a vertical misalignment determining unit 630 determining that vertical misalignment of the sensor 100 occurs when the signal intensity of the surface reflected wave measured by the surface reflected wave measuring unit 610 exceeds a reference signal intensity, and a vertical alignment adjusting unit 640 correcting the vertical misalignment of the sensor 100 by controlling a tilting motor 400, switching one of a plurality of transmitting antennas Tx1, Tx2, . . . , TxM or 310 set to different radiating angles to one set to the radiating angle required to correct the vertical misalignment, or switching one of a plurality of receiving antennas Rx1, Rx2, . . . , RxN or 330 set to different receiving angles to one set to the receiving angle required to correct the vertical misalignment.

The surface reflected wave measuring unit 610 detects the reflected wave received by the transmitted sensor signal. As a result of the detection, when the reflected wave exceeding a predetermined signal intensity on a specific frequency region is detected for a preset time as indicated by a reference number 700 in FIG. 7, the surface reflected wave measuring unit 610 determines the reflected wave detected in this condition to be the surface reflected wave, and then measures the signal intensity of the determined surface reflected wave.

The reference signal intensity as mentioned above is information serving as a criteria for determining the vertical misalignment through comparison with the signal intensity of the surface reflected wave. In the ideal case where the vertical alignment of the sensor 100 is correctly adjusted, the reference signal intensity will be a value of zero (0). Further, in the non-ideal case, i.e. in the real environment, the reference signal intensity may be previously defined so as to have a predetermined value or a predetermined range of values.

Meanwhile, referring to FIG. 6, the sensor vertical alignment adjusting apparatus 600 according to an embodiment of the present invention may further include a target sensing distance measuring unit 620 measuring a sensible maximum distance from a target as a target sensing distance on the basis of the received reflected wave.

In the case in which the sensor vertical alignment adjusting apparatus 600 further includes the target sensing distance measuring unit 620, the vertical misalignment determining unit 630 may determine that the vertical misalignment of the sensor 100 occurs when the signal intensity of the surface reflected wave measured by the surface reflected wave measuring unit 610 exceeds the reference signal intensity, and when the target sensing distance measured by the target sensing distance measuring unit 620 is less than a reference target sensing distance.

In detail, the vertical misalignment determining unit 630 may determine whether or not the vertical misalignment of the sensor occurs in consideration of only the signal intensity of the surface reflected wave, or both of the signal intensity of the surface reflected wave and the target sensing distance. However, the following description will be made on the assumption that the vertical misalignment determining unit 630 determines whether or not the vertical misalignment of the sensor occurs in consideration of both of the signal intensity of the surface reflected wave and the target sensing distance.

When it is determined that the vertical misalignment of the sensor 100 occurs, the aforementioned vertical alignment adjusting unit 640 corrects the vertical misalignment of the sensor 100 by calculating an angle of the vertical misalignment of the sensor 100 (i.e. a misalignment angle) on the basis of the measured signal intensity of the surface reflected wave, the reference signal intensity, the measured target sensing distance, and the reference target sensing distance, and by controlling the tilting motor 400, switching one of a plurality of transmitting antennas Tx1, Tx2, . . . , TxM or 310 set to different radiating angles to one set to the radiating angle required to correct the vertical misalignment, or switching one of a plurality of receiving antennas Rx1, Rx2, . . . , RxN or 330 set to different receiving angles to one set to the receiving angle required to correct the vertical misalignment, on the basis of the calculated misalignment angle. As a result of this correction, the signal intensity of the surface reflected wave becomes lower than the reference signal intensity, and the target sensing distance does not become less than the reference target sensing distance.

Figure 8:
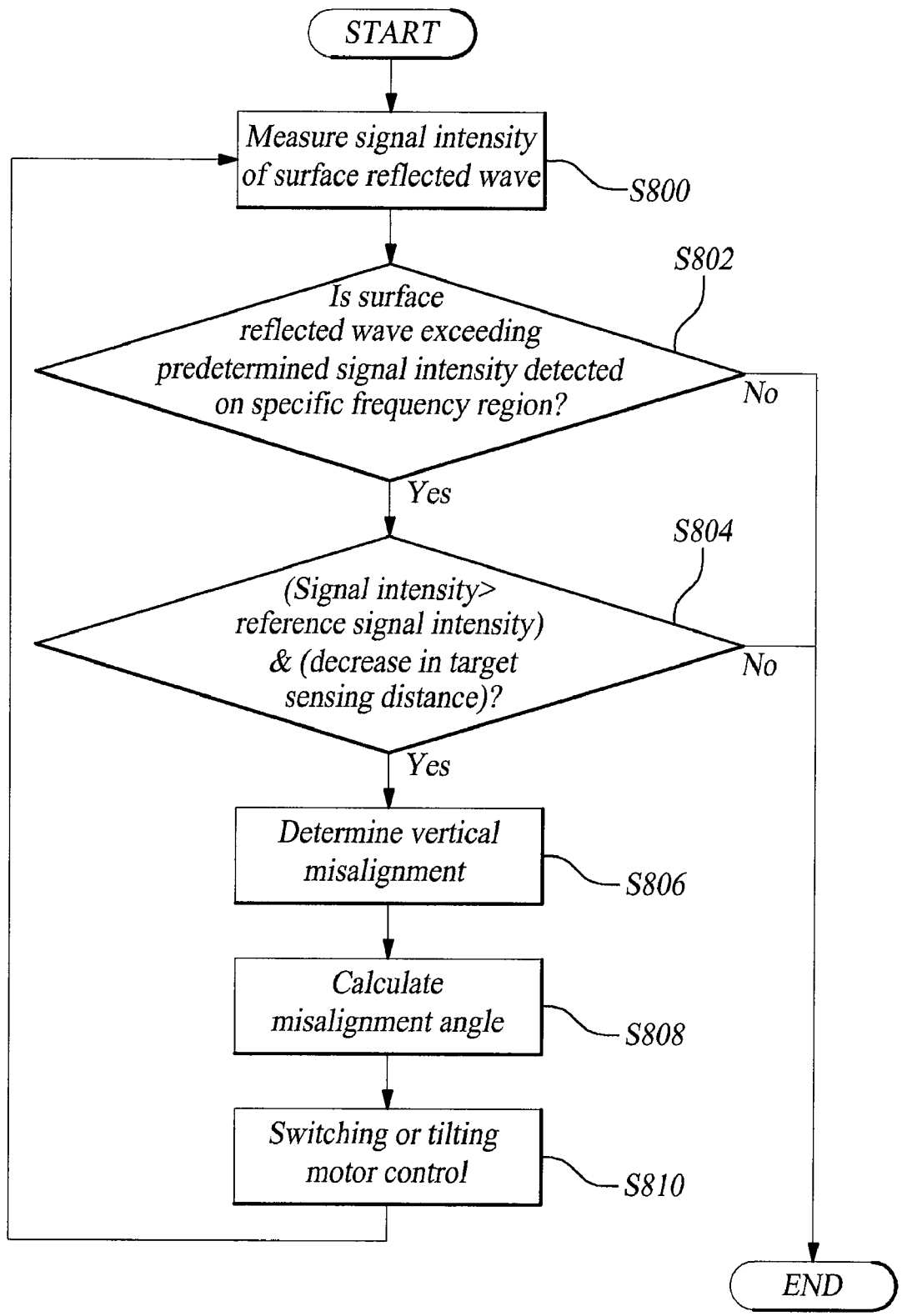
FIG. 8 is a flow chart showing a method of adjusting sensor vertical alignment according to an embodiment of the present invention.

FIG. 8 is a flow chart showing a sensor vertical alignment adjusting method applied to the sensor vertical alignment adjusting apparatus 600 described with reference to FIG. 6 according to an embodiment of the present invention. The sensor vertical alignment adjusting method according to an embodiment of the present invention will be described below with reference to FIG. 8.

Referring to FIG. 8, the signal intensity of a surface reflected wave on a specific frequency region is measured on the basis of a reflected wave received by a sensor signal transmitted from a sensor 100 (S800). It is determined whether or not the surface reflected wave exceeding a predetermined signal intensity is detected on the specific frequency region for a preset time (S802). As a result of the determination, if the surface reflected wave exceeding a predetermined signal intensity is not detected on the specific frequency region for a preset time, the adjustment of the vertical alignment of the sensor 100 is terminated. In contrast, if the surface reflected wave exceeding a predetermined signal intensity is detected, it is determined whether or not the signal intensity of the surface reflected wave detected on the specific frequency region for the preset time exceeds a reference signal intensity (or a critical value), and whether or not a target sensing distance measured on the basis of the received reflected wave (i.e. a maximum distance which a target can be sensed) is less than a reference target sensing distance (S804).

Referring to FIG. 8 again, as a result of the determination, if the signal intensity of the surface reflected wave exceeds a reference signal intensity (or a critical value), and if a target sensing distance measured on the basis of the received reflected wave (i.e. a maximum distance which a target can be sensed) is less than a reference target sensing distance, it is determined that vertical misalignment of the sensor 100 occurs (S806). Then, an angle of the vertical misalignment of the sensor 100 (i.e. a misalignment angle) is calculated on the basis of the measured signal intensity of the surface reflected wave, the reference signal intensity, the measured target sensing distance, and the reference target sensing distance (S808).

Subsequently, referring to FIG. 8, on the basis of the calculated misalignment angle, the tilting motor 400 is controlled, one of the plurality of transmitting antennas Tx1, Tx2, . . . , TxM or 310 set to different radiating angles is switched to one set to the radiating angle required to correct the vertical misalignment, or one of a plurality of receiving antennas Rx1, Rx2, . . . , RxN or 330 set to different receiving angles is switched to one set to the receiving angle required to correct the vertical misalignment (S810). Then, until the vertical misalignment of the sensor 100 is corrected to terminate the adjustment of the vertical alignment, i.e. until the surface reflected wave exceeding a predetermined signal intensity is not detected on a specific frequency region in step S802, or until the signal intensity of the surface reflected wave is lower than the reference signal intensity in step S804, it is repeated from step S800.

Figure 9:
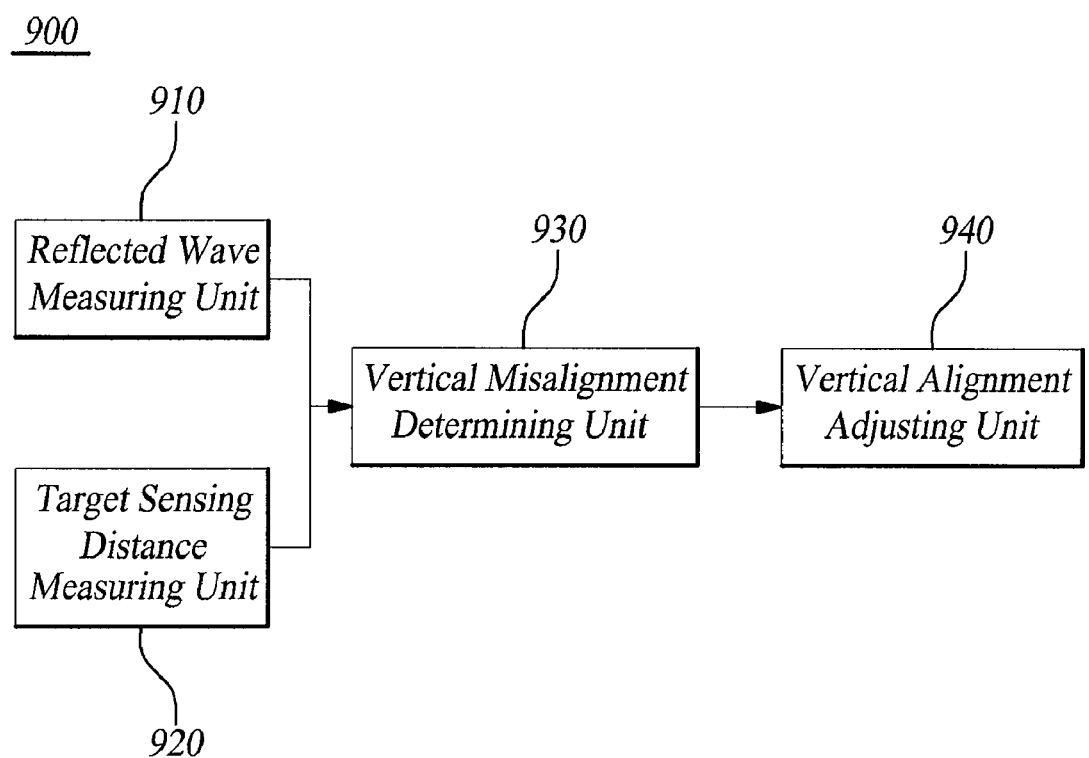
FIG. 9 is a block diagram showing an apparatus for adjusting sensor vertical alignment according to another embodiment of the present invention.

FIG. 9 is a block diagram showing an apparatus 900 for adjusting sensor vertical alignment according to another embodiment of the present invention.

Referring to FIG. 9, the sensor vertical alignment adjusting apparatus 900 according to another embodiment of the present invention includes a reflected wave measuring unit 910 measuring the signal intensity of a reflected wave reflected and received from an object by a sensor signal transmitted from a sensor 100, a vertical misalignment determining unit 930 determining that vertical misalignment of the sensor 100 occurs when the measured signal intensity of the reflected wave is lower than a reference signal intensity, and a vertical alignment adjusting unit 940 correcting the vertical misalignment of the sensor 100 by controlling a tilting motor 400, switching one of a plurality of transmitting antennas 310 set to different radiating angles to one set to the radiating angle required to correct the vertical misalignment, or switching one of a plurality of receiving antennas Rx1, Rx2, . . . , RxN or 330 set to different receiving angles to one set to the receiving angle required to correct the vertical misalignment.

The signal intensity of the reflected wave which is measured by the reflected wave measuring unit 910 may be, for instance, an average value (or an average power value) of the signal intensities of the reflected waves reflected from the objects when the vehicle is stopped on a road during traveling. For example, as shown in FIG. 10A, when the vehicle travels on the road for a predetermined time (e.g. 10 minutes), it is possible to obtain an average value of the signal intensities of the reflected waves reflected from the stationary objects (e.g. guardrails, roadside trees, etc.). As shown in FIG. 10B, when the vehicle travels for a predetermined time, it is possible to calculate an average value (or an average power value) of the signal intensities of the reflected waves reflected from the objects although the average value has a deflection according to the traveling situation of a country road, a highway, or a city road. At this time, when the average value (or the average power value) of the signal intensities of the reflected waves is less than a predetermined reference signal intensity (critical value), the sensor 100 is regarded to be deviate in an upward or downward direction. Thus, the transmitting antenna beam region (i.e. the first or third transmitting antenna beam region of FIG. 1), i.e. the vertical misalignment, can be repetitively corrected through the antenna switching mode (i.e. the transmitting antenna switching mode or the receiving antenna switching mode) or the tilting motor control mode until the average value (or the average power value) of the signal intensities of the reflected waves is more than the reference signal intensity.

Referring to FIG. 9, the sensor vertical alignment adjusting apparatus 900 according to another embodiment of the present invention may further include a target sensing distance measuring unit 920, which measures a sensible maximum distance from a target as a target sensing distance on the basis of the received reflected wave.

In the case in which the sensor vertical alignment adjusting apparatus 900 further includes the target sensing distance measuring unit 920, the vertical misalignment determining unit 930 determines that the vertical misalignment of the sensor 100 occurs in a downward direction when the measured signal intensity of the reflected wave is lower than the reference signal intensity, and when the measured target sensing distance is less than a reference target sensing distance. Thus, the aforementioned vertical alignment adjusting unit 940 corrects the downward vertical misalignment of the sensor 100 by calculating an angle of the downward vertical misalignment of the sensor 100 on the basis of the measured signal intensity of the reflected wave, the reference signal intensity, the measured target sensing distance, and the reference target sensing distance, and by controlling the tilting motor 400 in an upward direction, switching one of a plurality of transmitting antennas Tx1, Tx2, . . . , TxM or 310 set to different radiating angles to one set to the radiating angle required to correct the vertical misalignment, or switching one of a plurality of receiving antennas Rx1, Rx2, . . . , RxN or 330 set to different receiving angles to one set to the receiving angle required to correct the vertical misalignment, until the signal intensity of the reflected signal is higher than the reference signal intensity on the basis of the calculated downward misalignment angle. As a result of this correction of the vertical misalignment, the signal intensity of the reflected wave becomes higher than the reference signal intensity.

Further, the vertical misalignment determining unit 930 may determine that the vertical misalignment of the sensor 100 occurs in an upward direction when the measured signal intensity of the reflected wave is lower than the reference signal intensity, and when the measured target sensing distance is not less than the reference target sensing distance. Thus, the aforementioned vertical alignment adjusting unit 940 corrects the upward vertical misalignment of the sensor 100 by calculating an angle of the upward vertical misalignment of the sensor 100 on the basis of the measured signal intensity of the reflected wave, the reference signal intensity, the measured target sensing distance, and the reference target sensing distance, and by controlling the tilting motor 400 in a downward direction, switching one of a plurality of transmitting antennas Tx1, Tx2, . . . , TxM or 310 set to different radiating angles to one set to the radiating angle required to correct the vertical misalignment, or switching one of a plurality of receiving antennas Rx1, Rx2, . . . , RxN or 330 set to different receiving angles to one set to the receiving angle required to correct the vertical misalignment, until the signal intensity of the reflected signal is higher than the reference signal intensity on the basis of the calculated upward misalignment angle. As a result of this correction of the vertical misalignment, the signal intensity of the reflected wave becomes higher than the reference signal intensity.

FIG. 11 is a flow chart showing a sensor vertical alignment adjusting method applied to the sensor vertical alignment adjusting apparatus 900 described with reference to FIG. 9 according to another embodiment of the present invention. The sensor vertical alignment adjusting method according to another embodiment of the present invention will be described below with reference to FIG. 11.

Referring to FIG. 11, the signal intensity of a reflected wave reflected from an object by a sensor signal transmitted from the sensor 100 is measured (S1100). It is determined whether or not the measured signal intensity of the reflected wave is lower than a predetermined signal intensity (S1102). As a result of the determination, if the measured signal intensity of the reflected wave is lower than a predetermined signal intensity, it is determined that vertical misalignment of the sensor 100 occurs, and thus it is recognized that it is necessary to adjust vertical alignment of the sensor 100. Afterwards, a sensible maximum distance from a target is measured as a target sensing distance on the basis of the received reflected wave. When the measured target sensing distance is less than a reference target sensing distance, it is determined that the vertical misalignment of the sensor 100 occurs in a downward direction (1108). In contrast, when the measured target sensing distance is not less than the reference target sensing distance, it is determined that the vertical misalignment of the sensor 100 occurs in an upward direction (1106). Afterwards, how much the vertical misalignment of the sensor 100 occurs in the downward or upward direction is calculated using the misalignment angle (S1110). Then, on the basis of the calculated misalignment angle, the tilting motor 400 is controlled in an upward or downward direction, one of a plurality of transmitting antennas Tx1, Tx2, . . . , TxM or 310 set to different radiating angles is switched to one set to the radiating angle required to correct the vertical misalignment, or one of a plurality of receiving antennas Rx1, Rx2, . . . , RxN or 330 set to different receiving angles is switched to one set to the receiving angle required to correct the vertical misalignment (S1112). It proceeds to step S1100 again, and it is checked whether or not the vertical misalignment of the sensor is corrected. If the vertical misalignment of the sensor is corrected, the process is terminated. If the vertical misalignment of the sensor is not corrected, the aforementioned processes are repeated until the correction of the vertical misalignment of the sensor is completed.

FIG. 12 is a block diagram showing an apparatus 1200 for adjusting sensor vertical alignment according to yet another embodiment of the present invention.

Referring to FIG. 12, the sensor vertical alignment adjusting apparatus 1200 according to yet another embodiment of the present invention includes a vertical slope measuring unit 1210 measuring the vertical slope of a sensor 100 on the basis of a road surface through an acceleration sensor (also known as a gravity (G) sensor), a vertical misalignment determining unit 1230 determining that vertical misalignment of the sensor 100 occurs when a difference between the measured vertical slop of the sensor and a vertical slope of the road surface exceeds a predetermined range, and a vertical alignment adjusting unit 1240 correcting the vertical misalignment of the sensor by controlling a tilting motor 400, switching one of a plurality of transmitting antennas Tx1, Tx2, . . . , TxM or 310 set to different radiating angles to one set to the radiating angle required to correct the vertical misalignment, or switching one of a plurality of receiving antennas Rx1, Rx2, . . . , RxN or 330 set to different receiving angles to one set to the receiving angle required to correct the vertical misalignment such that the difference between the measured vertical slop of the sensor and the vertical slope of the road surface is within the predetermined range.

The aforementioned road surface may be a horizontal plane (i.e. a plane perpendicular to the gravitational direction) or an inclined surface having a predetermined angle. Thus, the vertical slope of the road surface may be a gravitational slope or a slope having a predetermined angle with respect to the gravitational direction.

Herein, the vertical alignment adjusting function of correcting the vertical misalignment of the sensor 100 refers to a function of adjusting the radiating angle of the sensor signal transmitted from the sensor 100 or a function of adjusting the receiving angle at which the reflected wave of the sensor signal transmitted from the sensor 100 is received.

Further, the sensor 100 may be one of a radar sensor, an infrared sensor, an ultrasonic sensor, and so on, and may include a tilting motor, a plurality of antennas, and a switch switching these antennas. Also, the sensor 100 may have a sensor vertical alignment adjusting apparatus mounted therein.

According to the present invention as described above, when a sensor mounted in a vehicle is subjected to a change in position or direction due to a little fender-bender, a rear-end or head-on collision, decrepitude of the vehicle, this change can be detected to automatically adjust vertical alignment of the sensor.

Further, it is sensed whether or not it is necessary to adjust vertical alignment of the sensor. If it is necessary to do so, the vertical alignment of the sensor can be automatically adjusted. Thereby, any systems using the sensor are allowed to carry out their correct functions, and ultimately ensuring safe driving to a driver of the vehicle.

Even when all the elements of the embodiments of the invention are combined into one, the invention is not limited thereto. That is, all the elements may be selectively combined with each other without departing the scope the invention. Also, all the elements may be implemented by independent hardware respectively, but it is also possible for the respective elements to be partially or wholly implemented as a computer program with program modules that are optionally combined in such a manner as to perform a part or all of combinational functions in one or multiple hardware. Codes and code segments constituting the programs can be easily inferred by computer programmers skilled in the art. In addition, the computer program may be stored in computer readable media, read and executed by a computer, thereby implementing the embodiments of the present invention. Examples of the computer readable media include magnetic recording media, optical recording media, and carrier wave media.

Also, the phraseology and terminology used herein is for the purpose of description and should not be regarded as limiting. The use of "including", "comprising", or "having", and variations thereof herein, is meant to encompass the items listed thereafter and equivalents thereof as well as additional items. Unless otherwise specifically defined herein, all terms including technical or scientific terms are to be given meanings understood by those skilled in the art. Like terms defined in dictionaries, generally used terms needs to be construed as meanings used in technical contexts and are not construed as ideal or excessively formal meanings unless otherwise clearly defined herein.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. Therefore, the embodiments of the invention are given not to limit but to explain the technical spirit of the invention, and the scope of the invention is not limited by the embodiments. The scope of the invention should be construed by the claims, and the equivalents to the invention are construed as included in the scope of the invention.

What is claimed is:

1. An apparatus for adjusting sensor vertical alignment, the apparatus comprising:
    a surface reflected wave measuring unit measuring signal intensity of a surface reflected wave reflected from a road surface on a basis of the reflected wave received by a sensor signal transmitted from a sensor;
    a vertical misalignment determining unit determining that vertical misalignment of the sensor occurs when the measured signal intensity of the surface reflected wave exceeds a reference signal intensity; and
    a vertical alignment adjusting unit automatically correcting the vertical misalignment of the sensor, in response to a determination by the vertical misalignment determining unit that vertical misalignment of the sensor occurs, by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment.

2. The apparatus as claimed in claim 1, wherein the surface reflected wave measuring unit detects the reflected wave received by the transmitted sensor signal and, when the reflected wave exceeding a predetermined signal intensity on a specific frequency region is detected for a preset time as a result of the detection, determines the detected reflected wave to be the surface reflected wave, and measures the signal intensity of the surface reflected wave.

3. The apparatus as claimed in claim 1, further comprising a target sensing distance measuring unit measuring a sensible maximum distance from a target as a target sensing distance on a basis of the received reflected wave,
    wherein the vertical misalignment determining unit determines that the vertical misalignment of the sensor occurs when the measured signal intensity of the surface reflected wave exceeds the reference signal intensity and when the measured target sensing distance is less than a reference target sensing distance.

4. The apparatus as claimed in claim 3, wherein the vertical alignment adjusting unit corrects the vertical misalignment of the sensor
    by calculating an angle of the vertical misalignment of the sensor on a basis of the measured signal intensity of the surface reflected wave, the reference signal intensity, the measured target sensing distance, and the reference target sensing distance when it is determined that the vertical misalignment of the sensor occurs, and
    by controlling the tilting motor, switching one of the plurality of transmitting antennas set to different radiating angles to one set to the radiating angle required to correct the vertical misalignment, or switching one of the plurality of receiving antennas set to different receiving angles to one set to the receiving angle required to correct the vertical misalignment, on a basis of the calculated misalignment angle; and
    as a result of the correction, the signal intensity of the surface reflected wave becomes lower than the reference signal intensity, and the target sensing distance does not become less than the reference target sensing distance.

5. An apparatus for adjusting sensor vertical alignment, the apparatus comprising:
    a reflected wave measuring unit measuring signal intensity of a reflected wave received by a sensor signal transmitted from a sensor;
    a vertical misalignment determining unit determining that vertical misalignment of the sensor occurs when the measured signal intensity of the reflected wave is lower than a reference signal intensity; and
    a vertical alignment adjusting unit automatically correcting the vertical misalignment of the sensor, in response to a determination by the vertical misalignment determining unit that vertical misalignment of the sensor occurs, by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment.

6. The apparatus as claimed in claim 5, further comprising a target sensing distance measuring unit measuring a sensible maximum distance from a target as a target sensing distance on a basis of the received reflected wave.

7. The apparatus as claimed in claim 6, wherein the vertical misalignment determining unit determines that the vertical misalignment of the sensor occurs in a downward direction when the measured signal intensity of the reflected wave is lower than the reference signal intensity and when the measured target sensing distance is less than a reference target sensing distance;
    the vertical alignment adjusting unit corrects the vertical misalignment of the sensor
    by calculating an angle of the downward vertical misalignment of the sensor on a basis of the measured signal intensity of the reflected wave, the reference signal intensity, the measured target sensing distance, and the reference target sensing distance, and
    by controlling the tilting motor, switching one of the plurality of transmitting antennas set to different radiating angles to one set to the radiating angle required to correct the vertical misalignment, or switching one of the plurality of receiving antennas set to different receiving angles to one set to the receiving angle required to correct the vertical misalignment, on a basis of the calculated downward misalignment angle; and as a result of the correction, the signal intensity of the reflected wave becomes higher than the reference signal intensity.

8. The apparatus as claimed in claim 6, wherein the vertical misalignment determining unit determines that the vertical misalignment of the sensor occurs in an upward direction when the measured signal intensity of the reflected wave is lower than the reference signal intensity and when the measured target sensing distance is not less than a reference target sensing distance;

the vertical alignment adjusting unit corrects the vertical misalignment of the sensor by calculating an angle of the upward vertical misalignment of the sensor on a basis of the measured signal intensity of the reflected wave, the reference signal intensity, the measured target sensing distance, and the reference target sensing distance, and by controlling the tilting motor, switching one of the plurality of transmitting antennas set to different radiating angles to one set to the radiating angle required to correct the vertical misalignment, or switching one of the plurality of receiving antennas set to different receiving angles to one set to the receiving angle required to correct the vertical misalignment, on a basis of the calculated upward misalignment angle; and as a result of the correction, the signal intensity of the reflected wave becomes higher than the reference signal intensity.

9. A sensor comprising:

a plurality of transmitting antennas set to different radiating angles;

a switch selecting the transmitting antenna set to the radiating angle nearest a desired radiating angle from the transmitting antennas such that a sensor signal is transmitted at the desired radiating angle;

a plurality of receiving antennas receiving a reflected wave of the sensor signal transmitted through the transmitting antenna selected by the switch; and an apparatus for adjusting sensor vertical alignment that:

measures signal intensity of a reflected wave reflected and received from at least one of an object and a road surface by the sensor signal, determines whether or not vertical misalignment of the sensor occurs on a basis of the measured signal intensity of the reflected wave and a reference signal intensity, and automatically corrects the vertical misalignment of the sensor, in response to a determination that vertical misalignment of the sensor occurs, by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment.

10. The sensor claimed in claim 9, wherein the plurality of receiving antennas are set to receiving angles corresponding to the different radiating angles set for the plurality of transmitting antennas.

11. The sensor claimed in claim 9, wherein the plurality of receiving antennas has a single beam region that covers all beam regions of the plurality of transmitting antennas variably selected by the switch.

12. A sensor comprising:

a plurality of transmitting antennas transmitting a sensor signal;

a plurality of receiving antennas set to different receiving angles;

a switch selecting the receiving antenna set to the receiving angle nearest a specific radiating angle from the receiving antennas such that one of the plurality of transmitting antennas receives a reflected wave of the sensor signal transmitted at the specific radiating angle; and an apparatus for adjusting sensor vertical alignment that:

measures signal intensity of a reflected wave reflected and received from at least one of an object and a road surface by the sensor signal, determines whether or not vertical misalignment of the sensor occurs on a basis of the measured signal intensity of the reflected wave and a reference signal intensity, and automatically corrects the vertical misalignment of the sensor, in response to a determination that vertical misalignment of the sensor occurs, by controlling a tilting motor, switching one of a plurality of transmitting antennas set to different radiating angles to one set to the radiating angle required to correct the vertical misalignment, or switching one of a plurality of receiving antennas set to different receiving angles to one set to the receiving angle required to correct the vertical misalignment.

13. The sensor claimed in claim 12, wherein the plurality of transmitting antennas are set to radiating angles corresponding to the different receiving angles set for the plurality of receiving antennas.

14. The sensor claimed in claim 12, wherein the plurality of transmitting antennas has a single beam region that covers all beam regions of the plurality of receiving antennas variably selected by the switch.

* * * * *